(12) United States Patent
Sako

(10) Patent No.: US 6,363,148 B1
(45) Date of Patent: Mar. 26, 2002

(54) METHOD, APPARATUS AND COMPUTER PROGRAM FOR ACTIVATING AN ALTERNATE ENCRYPTION USING AN IDENTIFIER EMBEDDED IN DATA

(75) Inventor: Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/969,819

(22) Filed: Nov. 13, 1997

(30) Foreign Application Priority Data

Nov. 29, 1996 (JP) .............................................. 8-320457

(51) Int. Cl.[7] .................................................. H04L 9/16
(52) U.S. Cl. ......................................................... 380/28
(58) Field of Search .............................. 380/49, 33, 28

(56) References Cited

U.S. PATENT DOCUMENTS

| | | | | |
|---|---|---|---|---|
| 5,293,029 A | * | 3/1994 | Iijima ......................... | 235/380 |
| 5,530,750 A | * | 6/1996 | Akagiri ...................... | 704/500 |
| 5,548,648 A | * | 8/1996 | Yorke-Smith ................ | 380/49 |
| 5,619,575 A | * | 4/1997 | Koopman, Jr. et al. ....... | 380/28 |
| 5,649,014 A | * | 7/1997 | Koopman, Jr. et al. ....... | 380/28 |
| 5,740,251 A | * | 4/1998 | Tajima et al. ................ | 380/49 |
| 5,796,825 A | * | 8/1998 | McDonnal et al. ............ | 380/4 |
| 5,881,153 A | * | 3/1999 | Feldman et al. .............. | 380/28 |
| 5,903,652 A | * | 5/1999 | Mital ........................... | 380/25 |

OTHER PUBLICATIONS

Schneier, Bruce. Applied Cryptography: Protocols, Algorithms, and Source Code in C. 2nd ed. Oct. 1995. pp. 5–8.*

* cited by examiner

*Primary Examiner*—Gail Hayes
*Assistant Examiner*—Jeffrey Scott Leaning
(74) *Attorney, Agent, or Firm*—Bell, Boyd & Lloyd LLC (57) ABSTRACT

The present invention prevents code breaking of an important text or data even if a plain text and a cipher text are wire-tapped. An identifier judgment circuit judges whether data (a plain message) created by a user contains an identifier such as ">". If such an identifier is detected, the text or data specified by that identifier is supplied to a first encryption circuit, and the rest of the text or data is supplied to a second encryption circuit. The first encryption circuit enciphers the text or data using a first algorithm and supplies the enciphered data to a transmission circuit. The second encryption circuit enciphers the text or data using a second algorithm and supplies the enciphered data to the transmission circuit. The transmission circuit transmits the enciphered data through the Internet to another server.

36 Claims, 6 Drawing Sheets

METHOD, APPARATUS AND COMPUTER PROGRAM FOR ACTIVATING AN ALTERNATE ENCRYPTION USING AN IDENTIFIER EMBEDDED IN DATA

BACKGROUND OF THE INVENTION

1. Field of the Invention

The present invention relates to a data transmission method, a data transmission apparatus, a data recording medium, a data reception method, a data transmission apparatus, a data transmission/reception method, and a data transmission/reception apparatus which can preferably be used when transmitting an electronic mail.

2. Description of the Prior Art

With increase of communication through a network such as the Internet, there has arisen a problem of security in a network communication.

For example, in a communication processing service handling a personal information such as a mail box, a security technique is remarkably important in order to prevent information from being stolen or destroyed by other persons. There are two types of security techniques. One of them is a security technique using a password system in which a password is assigned to an information accumulated so that the information cannot be fetched by other persons. The other is a security technique using an encryption system in which meaning of the information cannot be understood without a key to decipher the information.

When transmitting a data through the Internet in which a data transmission route is unspecified, the encryption is used in most of cases, assuming that the data is wire-tapped by other persons.

It should be noted that the electronic mail can easily be broadcasted or transferred, and it is often the case that a user creates a new message citing a data or a text from another person. When such a message is transmitted, the data enciphered can easily be deciphered using the citation as a clue.

For example, if a wire-tapper A can fetch a part of a pair of a plain message M and a cipher text C created by a person to be wire-tapped, the wire-tapper A can decipher the enciphering method according to the plain message M and the cipher text C without using any decoding key.

Figure 1:
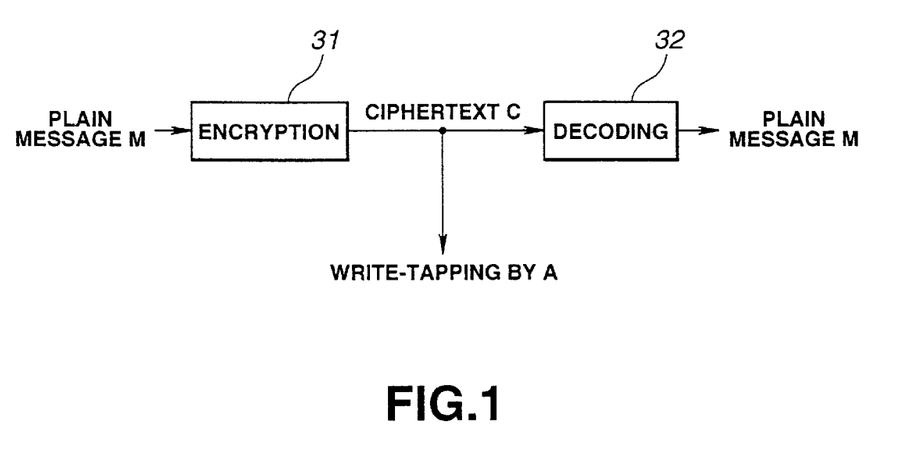
FIG. 1 explains a process how a conventional enciphered message is wire-tapped and deciphered.

Here, it is assumed that the wire tapper A transmits a message as an electronic mail to the person B to be wire-tapped. As shown in FIG. 1, the person a creates another message citing A's message (step S1) and enciphers the message in a encryption circuit 31 so as to be transmitted as an electronic mail to a third person D. In this case, it is assumed that only the person D can read the message which has been decoded by a decoding circuit 32 (step S3). However, if the person A can wire-tap the cipher text C transmitted from B to D (step S2), then the person A can get a part of a pair of the plain message M and the cipher text C, which enables person A to decipher without using a decoding key.

There have been two types of deciphering or code breaking often used: use of an identifier such as ">" often used when citing another message or a stereotype message such as "Dear sirs" as clue to decipherment (known-plain text attack); and transmitting a simple message to a person to be wire-tapped so that a cipher text of the simple message is wire-tapped for use in deciphering (chosen-plain text attack).

SUMMARY OF THE INVENTION

It is therefore an object of the present invention to provide a data transmission method, a data transmission apparatus, a data recording medium, a data reception method, a data reception apparatus, a data transmission/reception method, and a data transmission/reception apparatus which can prevent decipherment of a most important message and data even if a plain message or an enciphered message is wire-tapped In order to achieve the aforementioned object, the data transmission method according to the present invention comprises: a step of assigning an identifier to a particular data; a step of executing different encryption processes to a data having the identifier and a data not having the identifier; and a step of transmitting data which have been enciphered.

The data transmission apparatus according to the present invention comprises: identifier assigning means for assigning an identifier to a particular data; encryption means for executing different encryption processes to a data having the identifier and a data not having the identifier; and transmission means for transmitting data which have been enciphered.

The program recording/transfer medium according to the present invention contains or transfers a computer program for assigning an identifier for a particular data, executing different encryption processes to a data having the identifier and a data not having the identifier, and transmitting an enciphered data.

The data reception method according to the present invention comprises a step of receiving a data and executing different decoding processes to a data having an identifier and a data not having the identifier.

The data reception apparatus according to the present invention comprises: reception means for receiving an enciphered data; and decoding means for executing different decoding processes to a data having an identifier and a data not having the identifier.

The program recording/transfer medium according to the present invention contains or transfers a computer program for executing different decoding processes for a data received and containing an identifier and a data received and not containing the identifier.

The data transmission/reception method according to the present invention comprises: a step of assigning an identifier to a particular data; a step of executing different encryption processes to a data having the identifier and a data not having the identifier; a step of transmitting a data which has been subjected to encryption; a step of receiving the data; and a step for executing different decoding processes to a data having the identifier and a data not having the identifier.

The data transmission/reception apparatus according to the present invention comprises:

a data transmission block including: identifier assigning means for assigning an identifier to a particular data; enciphering means for executing different encryption processes to a data having the identifier and a data not having the identifier; and transmission means for transmitting a data which has been subjected to encryption; and a data reception block including: reception means for receiving the data; and decoding means for executing different decoding processes to a data having the identifier and a data not having the identifier.

The program recording/transfer medium according to the present invention contains or transfers:

a first computer program for assigning an identifier to a particular data, executing different encryption processes to a data having the identifier and a data not having the identifier, and transmitting a data which has been enciphered; and a second computer program for executing different decoding processes to a data received and having the identifier and a data received and not having the identifier.

DETAILED DESCRIPTION OF THE PREFERRED EMBODIMENTS

Description will now be directed to a first embodiment of the present invention with reference to the attached drawings. Considering that a transfer of an electronic mail becomes a clue to deciphering, the present invention prevents deciphering of a message or a data of top secret by enciphering and decoding in different ways for a part of the message or the data which will be a clue to the decoding and for the other part of the message or the data.

The present invention, for example, can be applied when transmitting an electronic mail from a mail server to another mail server through Internet.

Figure 2:
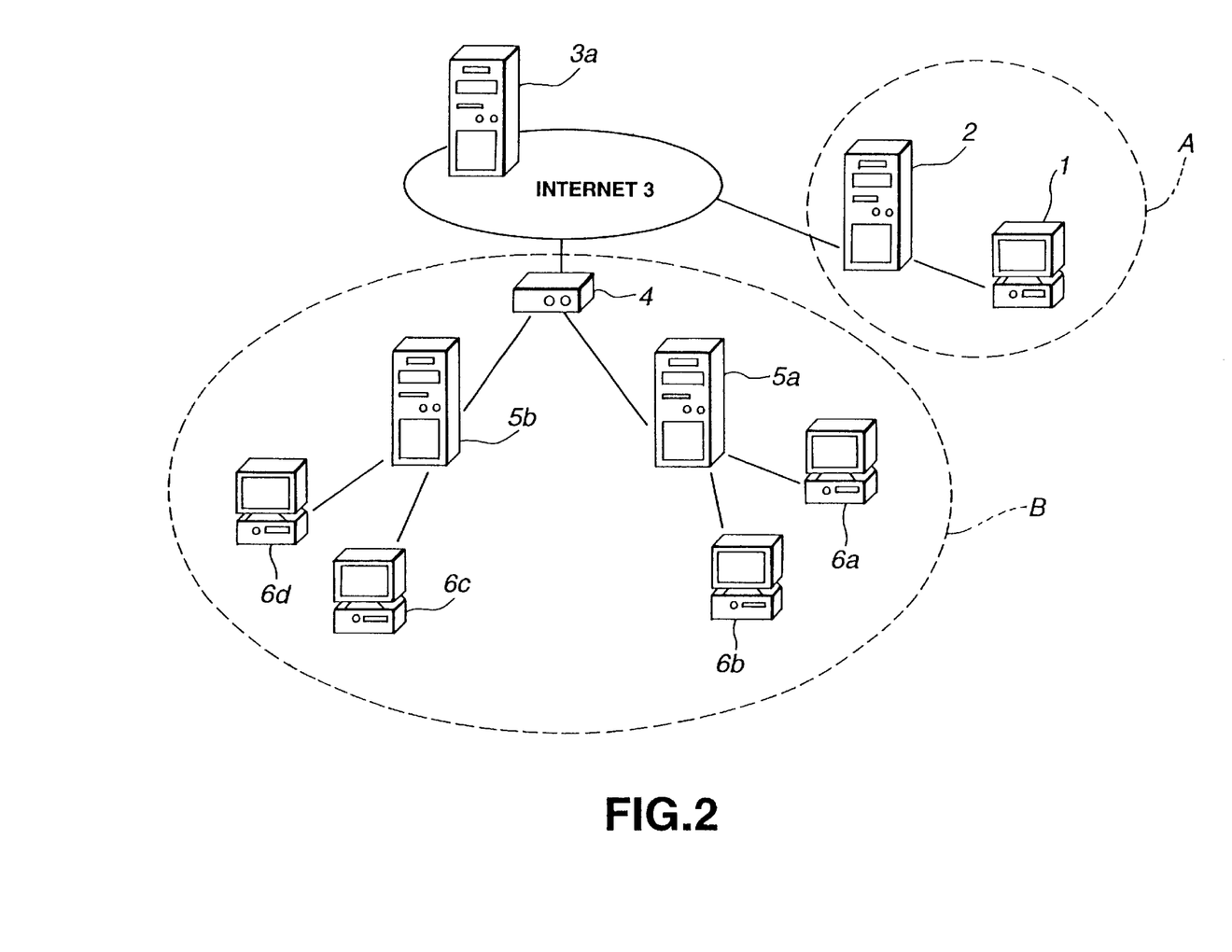
FIG. 2 explains an application of the present invention in a network configuration of the Internet.

For example, FIG. 2 shows that in a network A, a mail server 2 is connected to Internet 3 so as to transmit an electronic mail from a personal computer 1 to Internet.

In a network B, a gate way 4 is connected to Internet 3. A plurality of mail servers 5 (5a and 5b) serve to transmit electronic mails from a plurality of personal computers 6 (6a to 6d) through the gate way 4 to Internet. Note that the networks A and B can receive electronic mails.

Such an Internet electronic mail system is provided with a mail server in each of the domains. For example, a client user transmits and receives an electronic mail from/to the personal computer 1 through the mail server 2 of the domain to which his/her personal computer belongs. Similarly, client users of the personal computers 6a and 6b transmit and receive electronic mails to/from the mail server 5a of their domain, whereas client users of the personal computers 6c and 6d transmit and receive electronic mails to/from the mail server 5b of their domain.

Hereinafter, an example will be explained when the client user of the personal computer 1 transmits an electronic mail which is to be received by the client user(s) of the personal computer(s) 6.

The personal computer 1 operates a circuit which will be explained later, according to a data stored, for example, in a CD-ROM and a floppy disk. Here, the CD-ROM or the like contains a computer program for assigning an identifier to a particular a data, enciphering that particular data having the identifier and the other data having no such identifier in different ways, and transmitting an enciphered message.

Figure 3:
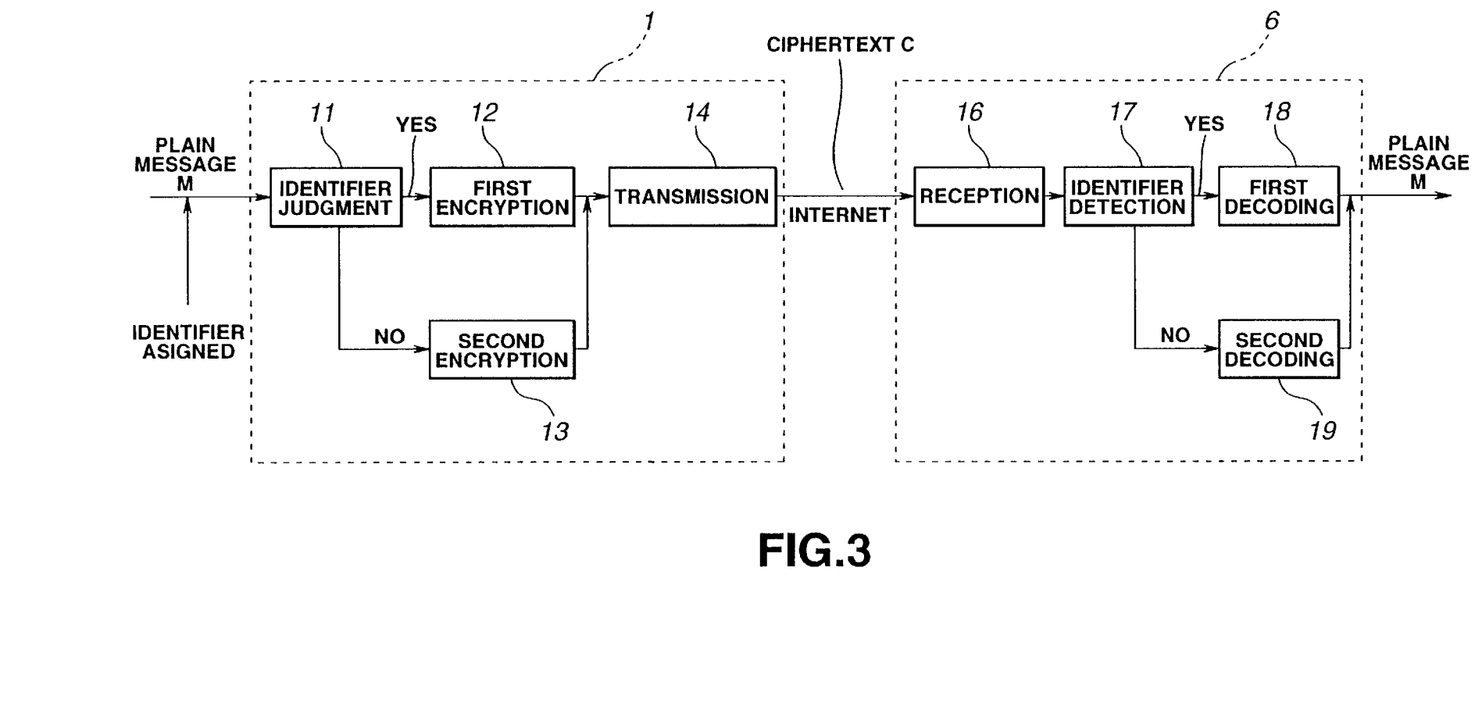
FIG. 3 is a block diagram showing a first embodiment of the present invention.

As shown in FIG. 3, the personal computer 1 is provided with an identifier judgment circuit 11 which determines whether a data has a predetermined identifier such as symbols ">" and "*"; a first encryption circuit 12 for enciphering a data by a predetermined method; a second encryption circuit 13; and a transmission circuit 14 which is a modem for modulating a enciphered data and transmitting the modulated enciphered data. These circuits are driven according to the aforementioned computer program.

It should be noted that the first enciphering circuit 12 and the second enciphering circuit 13 may have different encryption algorithms or different decoding keys without changing an encryption algorithm. Moreover, the personal computer 1 may down load the aforementioned computer program from a vendor server through a transmission medium such as Internet, so as to drive the aforementioned circuits according to this computer program.

A plain message created by a user normally contains identifiers such as ">", "*", and "-" indicating a citation part. The personal computer 1, prior to transmitting this message, carries out enciphering as follows.

The identifier judgment circuit 11 determines whether a data in the message contains an identifier such as ">". If the data has the identifier, the data is supplied to the first encryption circuit 12. If the data has no identifier, the data is supplied to the second encryption circuit 13. The first encryption circuit enciphers the data according to a predetermined algorithm, which is then supplied to the transmission circuit. The second encryption circuit 13 enciphers the rest of the message, which is then supplied to the transmission circuit 14. The transmission circuit 14 modulates the cipher text obtained and transmits it through Internet 3 to another mail server.

Here, the encryption may be carried out in the public key cryptosystem (such as RSA) or the private key cryptosystem (such as data encryption standard (DES) and fast encryption algorithm (FEAL)). Moreover, there may be a plurality of identifiers and accordingly, there may be more than two types of encryption.

When transmitting a mail, the transmission protocol used is the SMTP (simple mail transfer protocol) which is the superior protocol to the TCP/IP (transmission control protocol/Internet protocol). For example, an operation system of UNIX which is often used as a mail server carries out communication according to the SMTP named "sendmail". A mail client who transmits a mail also communicates directly with sendmail of SMTP.

Figure 4:
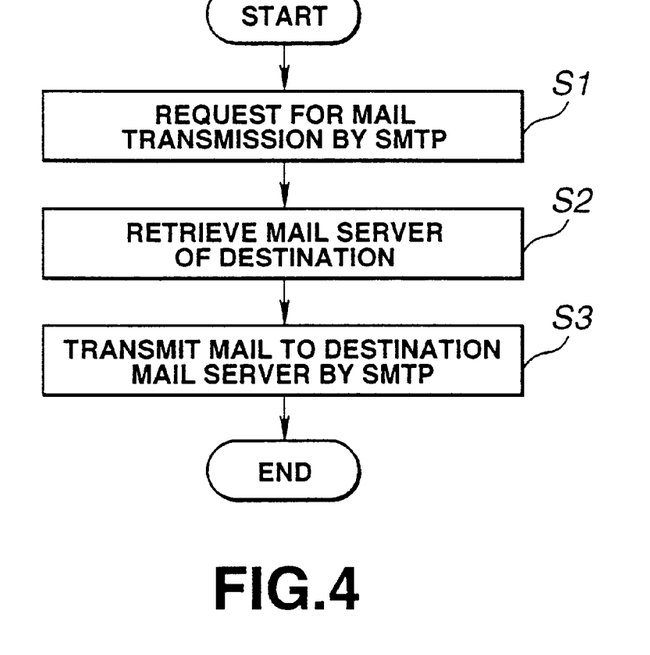
FIG. 4 is a flowchart showing a data transmission procedure.

More specifically, as shown in FIG. 4, when a mail client (addresser) specifies to transmit a mail, the personal computer 1 transmits the mail in SMITP to sendmail which is a mail delivery program of the mail server 2 so that the mail is sent to a destination (addressee) (step 1). The mail server 2, according to the sendmail process, inquires the DNS server of the destination domain about the IP address of the mail server so as to find the addressee (step S2). The mail server 2 transmits the mail through Internet 3 and the gate way 4 to the mail server 5 of the destination (step S3).

Figure 5:
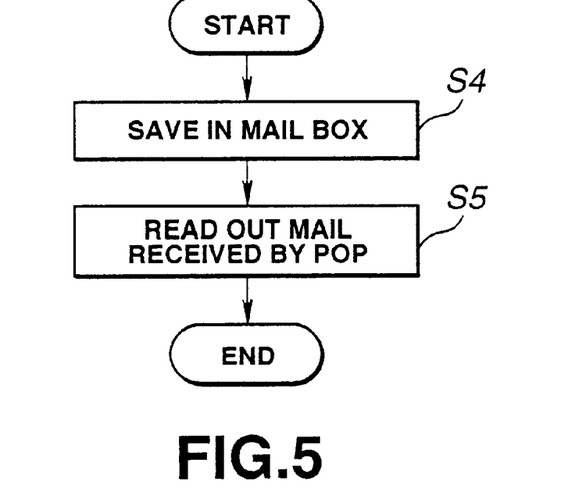
FIG. 5 is a flowchart showing a data reception procedure.

The mail server 5 receives the mail through the gate server 4 and, as shown in FIG. 5, stores this electronic mail as a file in a mail box (step S4). In order to read a mail on UNIX for example, the client user often uses the POP (Post Office Protocol) which is superior to the TCP/IP.

Moreover, an electronic mail on Internet is usually a text data. However, recently, there have been developed several types of electronic mail software which enable to add to the text data a binary data such as an image file. This electronic mail extension format is defined as MIME (Multipurpose Internet Mail Extensions).

Here, the personal computer 6 which receives the mail also controls respective circuits which will be detailed later, according to a data recorded on a recording medium such as a CD-ROM. More specifically, the CD-ROM or the like contains a computer program for executing different decoding processes for a data having the identifier and a data having no identifier.

As shown in FIG. 3, the personal computer 6 includes: a reception circuit 16 for decoding a modulated data received; an identifier detection circuit 17; a first decoding circuit 18; and a second decoding circuit 19. These circuits are driven according to the aforementioned computer program.

It should be noted that the first decoding circuit 18 and the second decoding circuit 19 may have different decoding algorithms or may have different decoding keys for identical decoding algorithms. Moreover, the personal computer 6 may down load a data for controlling the aforementioned circuits, from the server of the sender through the Internet transmission medium.

The reception circuit 16 demodulates the enciphered data received for supply to the identifier detection circuit 17. The identifier detection circuit 17 determines whether a data contains an identifier such as ">". If the data contains the identifier, a data specified by the identifier is supplied to the first decoding circuit 18, and the rest of the data is supplied to the second decoding circuit 19. Thus, the mail is decoded by the first decoding circuit 18 and the second decoding circuit 19.

Here, if it is assumed that a pair of plain message M and a cipher text C is wire-tapped and a cryptosystem is deciphered according to an identifier such as ">", it is possible to decipher only the data which has been enciphered by the first encryption circuit 12, whereas it is impossible to decipher the data which has been enciphered by the second encryption circuit 13. Consequently, it is possible to maintain security by transmitting a data of top secret without any identifier together with a data having identifiers.

Moreover, the user can assign an identifier on purpose for stereotype expressions such as "Dear Sirs" and "Sincerely yours" which can easily be attacked, so as to maintain security of the other part of a message, evading code breaking according to the attacked part.

That is, even if a cipher text is stolen from a data line, it is possible to evade the chosen-plain text attack and the known-plain text attack. This enables to obtain a high security, which is actually powerful in broadcasting or transfer of electronic mails.

Description will now be directed to a second embodiment of the present invention. Like components as in the first embodiment are denoted by the same symbols and their explanations will be omitted. The same applies to a third embodiment of the present invention.

Figure 6:
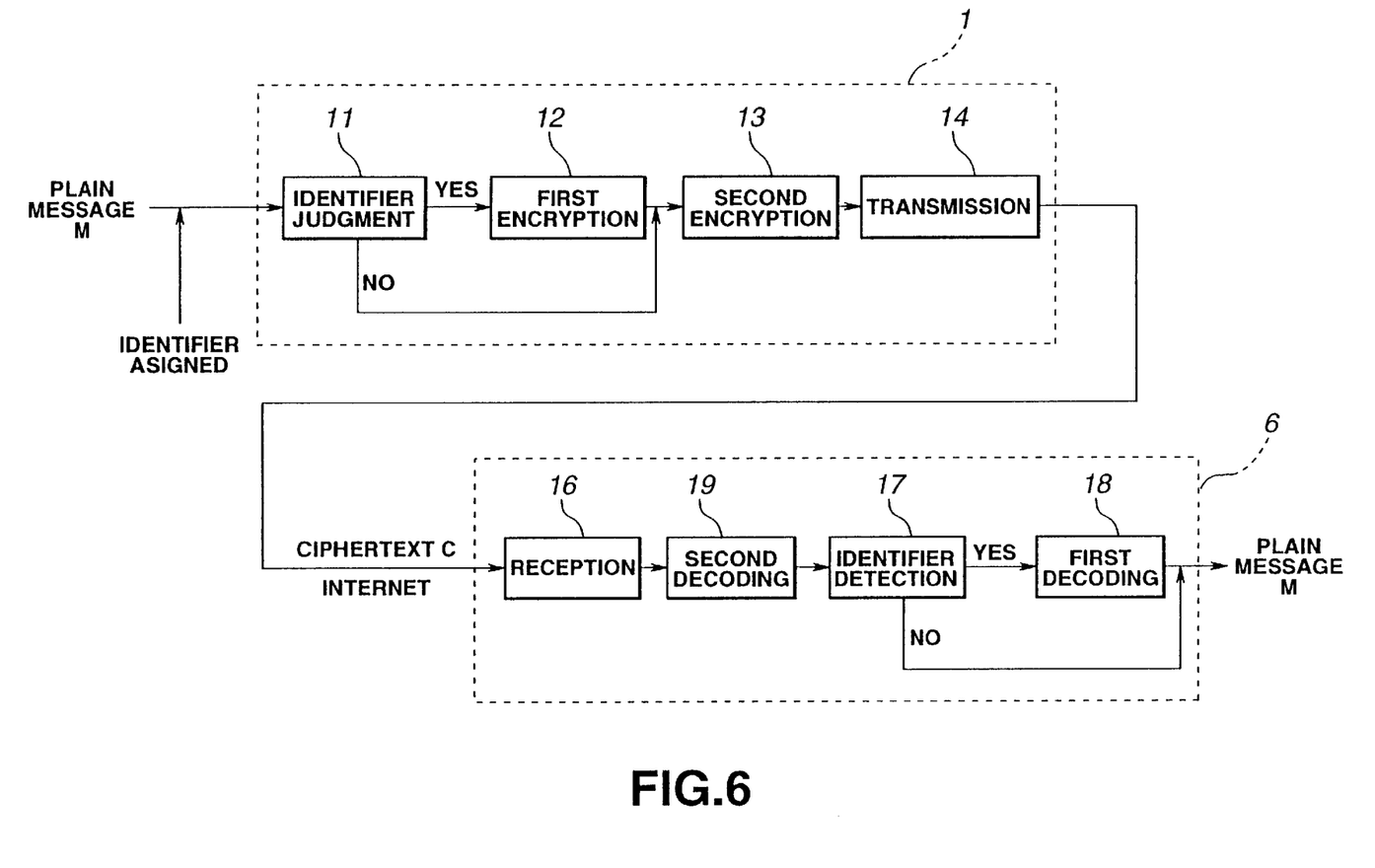
FIG. 6 is a block diagram showing a second embodiment of the present invention.

The personal computer 1 from which a mail is transmitted contains a computer program for judging whether a data has an identifier, executing a first encryption to a data having the identifier, and executing a second encryption to both of the data having the identifier and a data having no identifier. This personal computer 1 drives the respective circuits according to the aforementioned computer program, so as to execute dual encryption to a data having the identifier.

In the personal computer 1, the aforementioned first encryption circuit 12 is connected in series to the second encryption circuit 13 as shown in FIG. 6, instead of parallel connection. Here, the identifier judgment circuit 11 determines whether a data has an identifier such as ">" and supplies a data having the identifier to the first encryption circuit 12 and a data having no identifier directly to the second encryption circuit 13. The first encryption circuit 12 executes encryption to the data supplied and supplies the data to the second encryption circuit. Consequently, the second encryption circuit 13 executes encryption to both of the data which has been enciphered and the data not enciphered, which are transmitted together as a mail through Internet 3 to a mail server of the destination.

On the other hand, the personal computer 6 which receives the mail contains a computer program for executing to the data received a decoding which corresponds to the second encryption (hereinafter, referred to as a second decoding), detecting a data having the identifier in the mail which has been subjected to the second decoding, and executing to a detected data having the identifier a decoding which corresponds to the first encryption (hereinafter, referred to as a first decoding).

In this personal computer 6, the enciphered data received by the reception circuit is supplied to the second decoding circuit 19. The second decoding circuit 19 decodes a data which has been enciphered by the second encryption circuit 13 and supplies the resultant data to the identifier detecting circuit 17. When an identifier is detected by the identifier detection circuit 17, a data specified by the identifier is decoded by the first decoding circuit 18, whereas the rest of the data need not be decoded and directly outputted as it is.

That is, according to this second embodiment, a data having an identifier which may serve as a hint or clue to code breaking is subjected to dual encryption so that the text having the identifier itself cannot be deciphered at all.

It should be noted that the identifier detecting circuit 17 and the second decoding circuit 19 may be connected in an inverse order. Moreover, the personal computers 1 and 6 may make the server of the vendor transmit the aforementioned computer program for storage.

Description will now be directed to a third embodiment.

Figure 7:
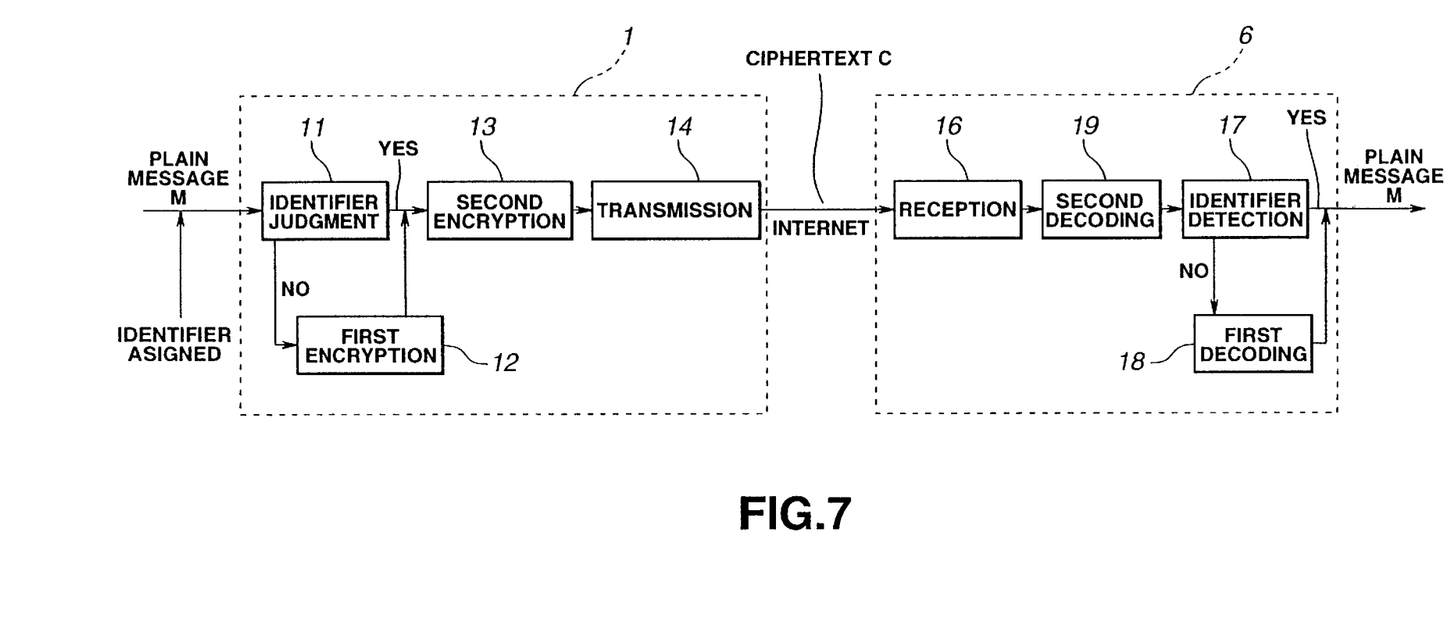
FIG. 7 is a block diagram showing a third embodiment of the present invention.

The personal computer 1 from which a mail is transmitted contains a computer program for judging whether an identifier is assigned for a data, executing a first encryption to a data not containing the identifier, and executing a second encryption to both of a data having the identifier and the data which has been subjected to the first encryption. Consequently, the personal computer 1 drives the respective circuits according to this computer program, so as to execute dual encryption to an important text and data not having the identifier.

More specifically, as shown in FIG. 7, the identifier judgment circuit 11 determines whether a data contains an identifier such as ">" and supplies a data having the identifier to the second encryption circuit 13 and the rest of the data to the first encryption circuit 12. The first encryption circuit 12 enciphers the supplied data and supplies the resultant data to the second encryption circuit 13. Consequently, the second encryption circuit 13 enciphers both of the data which has been enciphered and the data which has not been enciphered and transmits the resultant data as a mail via the transmission circuit 14.

On the other hand, the personal computer 6 which receives the mail contains a computer program for executing a second decoding to the received data, detecting the identifier of the data which has been subjected to the aforementioned second encryption, and executing a first decoding to a data having no identifier.

In the personal computer 6, an enciphered data received by the reception circuit 16 is supplied to the second decoding circuit 19. The second decoding circuit 19 decodes the supplied data which has been enciphered by the second encryption circuit 13, and supplies the decoded data to the identifier detecting circuit 17. When an identifier is detected by the identifier detecting circuit 17, a data specified by the identifier is directly outputted as it is, whereas the rest of the data is decoded by the first decoding circuit 18 before being outputted.

That is, according to this third embodiment, it is possible to improve security and safety of an enciphered data by carrying out a dual encryption to a text and data of top secret having no identifier. In other words, even if a data which has been enciphered by the second encryption circuit 13 is decoded, a data which has been enciphered by the first encryption circuit 12 cannot be decoded, enabling to enhance security. It should be noted that the identifier detecting circuit 17 and the second decoding circuit 19 may be connected in an inverse order.

Moreover, the user can assign an identifier on purpose for stereotype expressions such as "'Dear Sirs" and "Sinerely yours" which can easily be attacked, so as to maintain security of the other part of a message, evading code breaking according to the attacked part.

In the embodiments, the encryption system is changed depending on the detection of an identifier. However, the present invention is not limited to a case using a single identifier but can be applied to a case using several types of identifiers and using several encryption systems according to the respective identifiers. In such a case, the decoding system is also changed according to the encryption system.

As has thus far been described, b y using the data transmission method according to the present invention, it is possible to apply different cryptosystems to an important data and an unimportant data, which enables to prevent code breaking of the important data even if a plain text and a cipher text are wire-tapped.

By using the data transmission apparatus according to the present invention, it is possible to apply different cryptosystems to an important data and an unimportant data, which enables to prevent code breaking of the important data even if a plain text and a cipher text are wire-tapped.

The data recording medium according to the present invention is stored in a personal computer or the like so that the personal computer can distinguish an important data from an unimportant data and encipher them with different cryptosystems for transmission.

The data reception method according to the present invention enables to decode a text consisting of an important data and an unimportant data which have been enciphered with predetermined different cryptosystems.

The data reception apparatus according to the present invention enables to decode a text consisting of an important data and an unimportant data which have been enciphered with predetermined different cryptosystems.

The data recording medium according to the present invention is stored in a personal computer or the like so that the personal computer can distinguish an important data from an unimportant data contained in a text received, and decode them with predetermined different cryptosystdms.

The data transmission/reception method according to the present invention enables to encipher an important data and an unimportant data contained in a text with different cryptosystems and decode the text when received, so that the important data cannot be deciphered even if a plain text and a cipher text are wire-tapped.

The data transmission/reception apparatus according to the present invention enables to encipher an important data and an unimportant data contained in a text with different cryptosystems and decode the text when received, so that the important data cannot be deciphered even if a plain text and a cipher text are wire-tapped.

The data recording medium according to the present invention is stored in a personal computer or the like so that the personal computer can encipher an important data and an unimportant data contained in a text with different cryptosystems and further can receive and decode the text, thus preventing code breaking of the important data even if a plain text and a cipher text are wire-tapped.

What is claimed is:

1. A data transmission method comprising:
    a step of determining whether particular data to be encrypted includes information susceptible to at least one of chosen-plain text attack and known-plain text attack;
    a step of executing different encryption processes to said particular data having said information and said particular data not having said information in accordance with said step of determining to generate enciphered data; and
    a step of transmitting said enciphered data.

2. A data transmission method as claimed in claim 1, further comprising:
    a step of executing a first encryption to said particular data having said information and a second encryption to said particular data not having said information.

3. A data transmission method as claimed in claim 1, further comprising:
    a step of executing a first encryption to said particular data having said information; and
    a step of executing a second encryption to said particular data not having said information and to said particular data which has been subjected to said first encryption.

4. A data transmission method as claimed in claim 1, further comprising:
    a step of identifier;
    executing a first encryption to said particular data not having said information; and
    a step of executing a second encryption to said particular data having said information and to said particular data which has been subjected to said first encryption.

5. A data transmission apparatus comprising:
    information determining means for determining whether particular data to be encrypted includes information susceptible to at least one of chosen-plain text attack and known-plain text attack;
    encryption means for executing different encryption processes to said particular data having said information and said particular data not having said information in accordance with said determining means to generate enciphered data; and
    transmission means for transmitting said enciphered data.

6. A data transmission apparatus as claimed in claim 5, wherein:
    said encryption means has first encryption means for selectively enciphering said particular data having said information and second encryption means for enciphering said particular data not having said information.

7. A data transmission apparatus as claimed in claim 5, wherein:
    said encryption means has first encryption means for enciphering said particular data having said information, and second encryption means for enciphering said particular data not having said information and said particular data which has been enciphered by said first encryption means.

8. A data transmission apparatus as claimed in claim 5, wherein:

said encryption means has first encryption means for enciphering said particular data not having said information, and second encryption means for enciphering said particular data having said information and said particular data which has been enciphered by said first encryption means.

9. A program recording/transfer medium containing or transferring a computer program for controlling a computer to execute processing, said processing comprising the steps of:

determining whether particular data to be encrypted includes information susceptible to at least one of chosen-plain text attack and known-plain text attack;

executing different encryption processes to said particular data having said information and said particular data not having said information in accordance with said step of determining to generate enciphered data; and transmitting said enciphered data.

10. A program recording/transfer medium as claimed in claim 9, wherein said computer program controls said computer to execute processing further comprising:

executing a first encryption processing to said particular data having said information and a second encryption processing to said particular data not having said information.

11. A program recording/transfer medium as claimed in claim 9, wherein said computer program controls said computer to execute processing further comprising:

executing a first encryption processing to said particular data having said information and a second encryption processing to said particular data not having said information and to the particular data which has been subjected to said first encryption processing.

12. A program recording/transfer medium as claimed in claim 9, wherein said computer program controls said computer to execute processing further comprising:

executing a first encryption processing to said particular data not having said information and a second encryption processing to said particular data having said information and to the particular data which has been subjected to said first encryption processing.

13. A data reception method comprising the steps of:

receiving a data;

determining whether said data includes information susceptible to at least one of chosen-plain text attack and known-plain text attack; and executing different decoding processes to said data having said information and said data not having the information in accordance with said step of determining to generate decoded data.

14. A data reception method as claimed in claim 13, further comprising:

a step of executing a first decoding process to said data having said information; and a step of executing a second decoding process to said data not having said information.

15. A data reception method as claimed in claim 13 further comprising:

a step of executing a first decoding process to said data;

a step of detecting whether the data which has been subjected to said first decoding process has the information; and a step of executing a second decoding process to said data which has been detected to have the information.

16. A data reception method as claimed in claim 13 further comprising:

a step of executing a first decoding process to said data;

a step of detecting whether the data which has been subjected to said first decoding process has the information; and a step of executing a second decoding process to said data which has been detected not to have the information.

17. A data reception apparatus comprising:

reception means for receiving an enciphered data;

determining means for determining whether said enciphered data includes information susceptible to at least one of chosen-plain text attack and known-plain text attack; and decoding means for executing different decoding processes to said enciphered data having the information and said enciphered data not having the information in accordance with said determining means to generate decoded data.

18. A data reception apparatus as claimed in claim 17, wherein:

said decoding means has first decoding means for decoding said enciphered data having said information and second decoding means for decoding said enciphered data not having said information.

19. A data reception apparatus as claimed in claim 17, said decoding means having:

first decoding means for decoding said enciphered data;

information detecting means for detecting whether said enciphered data which has been decoded by said first decoding means has said information; and second decoding means for decoding said enciphered data which has been detected to have said information.

20. A data reception apparatus as claimed in claim 17, said decoding means having:

first decoding means for decoding said enciphered data;

information detecting means for detecting whether said enciphered data which has been decoded by said first decoding means has said information; and second decoding means for decoding said enciphered data which has been detected not to have said information.

21. A program recording/transfer medium containing or transferring a computer program for controlling a computer to execute processing, said processing comprising the steps of:

determining whether a data received includes information susceptible to at least one of chosen-plain text attack and known plain text attack; and executing different decoding processes to said data received having the information and said data received not having the information in accordance with said step of determining to generate decoded data.

22. A program recording/transfer medium as claimed in claim 21, wherein said computer program controls said computer to execute processing further comprising:

executing a first decoding process to said data received having said information and a second decoding process to said data received not having said information.

23. A program recording/transfer medium as claimed in claim 21, wherein said computer program controls said computer to execute processing further comprising:

executing a first decoding process to said data received;

detecting whether said data received which has been processed by said first decoding process has the information; and executing a second decoding process to said data received detected to have said information.

24. A program recording/transfer medium as claimed in claim 21, wherein said computer program controls said computer to execute processing further comprising:

executing a first decoding process to said data received;

detecting whether said data received which has been processed by said first decoding process has the information; and executing a second decoding process to said data received detected not to have said information.

25. A data transmission/reception method comprising:

a first step of determining whether particular data to be encrypted includes information susceptible to at least one of chosen-plain text attack and known-plain text attack;

a step of executing different encryption processes to said particular data having said information and said particular data not having said information in accordance with said first step of determining to generate enciphered data;

a step of transmitting said enciphered data;

a step of receiving the enciphered data;

a second step of determining whether the enciphered data includes the information; and a step of executing different decoding processes to the enciphered data having said information and the enciphered data not having said information in accordance with said second step of determining to generate decoded data.

26. A data transmission/reception method as claimed in claim 25, further comprising:

a step of executing a first encryption processes to said particular data having said information and a second encryption process to said particular data not having said information; and a step of executing a first decoding processes to said enciphered data having said information and a second decoding process to said enciphered data not having said information.

27. A data transmission/reception method as claimed in claim 25, further comprising:

a step of executing a first encryption processes to said particular data having said information and a second encryption process to said particular data not having said information and to the particular data which has been subjected to said first encryption process;

a step of executing a second decoding process which corresponds to said second encryption process to said enciphered data;

a step of detecting whether the enciphered data which has been subjected to said second decoding process has said information; and a step of executing a first decoding processes which corresponds to said first encryption process to said enciphered data detected to have said information.

28. A data transmission/reception method as claimed in claim 25, further comprising:

a step of executing a first encryption processes to said particular data not having said information and a second encryption process to said particular data having said information and to the particular data which has been subjected to said first encryption process;

a step of executing a second decoding process which corresponds to said second encryption process to said enciphered data;

a step of detecting whether the enciphered data which has been subjected to said second decoding process has said information; and a step of executing a first decoding which corresponds to said first encryption process to said enciphered data detected not to have said information.

29. A data transmission/reception apparatus comprising:

a data transmission block including:

first determining means for determining whether particular data to be encrypted includes information susceptible to at least one of chosen-plain text attack and known plain-text attack, enciphering means for executing different encoding processes to said particular data having said information and said particular data not having said information in accordance with said first determining means to generate enciphered data, and transmission means for transmitting said enciphered data; and a data reception block including:

reception means for receiving said enciphered data;

second determining means for determining whether the enciphered data includes the information, and decoding means for executing different decoding processes to said enciphered data having said information and said enciphered data not having said information in accordance with said second determining means to generate decoded data.

30. A data transmission/reception apparatus as claimed in claim 29, wherein:

said enciphering means includes first encryption means for enciphering said particular data having said information and second encryption means for enciphering said particular data not having said information; and said decoding means has first decoding means for decoding said enciphered data having said information and second decoding means for decoding said enciphered data not having said information.

31. A data transmission/reception apparatus as claimed in claim 29, wherein:

said enciphering means includes first encryption means for enciphering said particular data having said information and second encryption means for enciphering said particular data not having said information and said particular data which has been enciphered by said first encryption means; and said decoding means of said data reception block has:

second decoding means, which corresponds to said second encryption means, for decoding said enciphered data, information detecting means for detecting whether said enciphered data which has been decoded by said second decoding means has said information, and first decoding means for decoding said enciphered data having said information.

32. A data transmission/reception apparatus as in claim 29, wherein:

said enciphering means includes first encryption means for enciphering said particular data not having said information and second encryption means for enciphering said particular data having said information and said particular data which has been enciphered by said first encryption means;

said decoding means of said data reception block has:
second decoding means, which corresponds to said second encryption means, for decoding said enciphered data,
information detecting means for detecting whether said enciphered data which has been decoded by said second decoding means has said information, and
first decoding means for decoding said enciphered data not having said information.

33. A program recording/transfer medium containing or transferring a computer program for controlling a computer to execute processing, said processing including:
a first step of determining whether particular data to be encrypted includes information susceptible to at least one of chosen-plain text attack and known-plain text attack;
a step of executing different encryption processes to said particular data having said information and to said particular data not having said information in accordance with said first step of determining to generate enciphered data;
a step of transmitting said enciphered data;
a step of receiving the enciphered data;
a second step of determining whether the enciphered data includes the information; and
a step of executing different decoding processes to said enciphered data having said information and said enciphered data not having said information in accordance with said second step of determining to generate decoded data.

34. A program recording/transfer medium as claimed in claim 33, wherein said computer program controls said computer to execute processing further comprising:
executing a first encryption process to said particular data having said information and a second encryption process to said particular data not having said information; and
executing a first decoding process to said enciphered data having said information and a second decoding process to said enciphered data not having said information.

35. A program recording/transfer medium as claimed in claim 33, wherein said computer program controls said computer to execute processing further comprising:
executing a first encryption process to said particular data having said information and a second encryption process to said particular data not having said information and to said particular data which has been subjected to said first encryption process;
executing a second decoding process, which corresponds to said second encryption process, to said enciphered data;
detecting whether said enciphered data which has been subjected to said second decoding process has said information; and
executing a first decoding process, which corresponds to said first encryption process, to said enciphered data detected to have said information.

36. A program recording/transfer medium as claimed in claim 33, wherein said computer program controls said computer to execute processing further comprising:
executing a first encryption process to said particular data not having said information and a second encryption process to said particular data having said information and to said particular data which has been subjected to said first encryption process;
executing a second decoding process, which corresponds to said second encryption process, to said enciphered data,
detecting whether said enciphered data which has been subjected to said second decoding process has said information; and
executing a first decoding process, which corresponds to said first encryption process, to said enciphered data detected not to have said information.

\* \* \* \* \*